3,522,263
DISPERSE DYES OF THE (1,9)-ISOTHIAZOL-
ANTHRONE SERIES
Jacques Guenthard, Binningen, Basel-Land, Switzerland,
and Roland Mislin, Village-Neuf, France, assignors to
Sandoz Ltd. (also known as Sandoz A.G.), Basel,
Switzerland
No Drawing. Filed Aug. 2, 1966, Ser. No. 570,676
Claims priority, application Switzerland, Aug. 16, 1965,
11,486/65
Int. Cl. C07d 91/50
U.S. Cl. 260—303                            7 Claims

ABSTRACT OF THE DISCLOSURE 4-arylamino - (1,9) - isothiazolanthrone disperse dyes build up excellently from aqueous dispersion on materials of fully synthetic or semisynthetic high-molecular substances.

This invention relates to disperse dyes of the formula

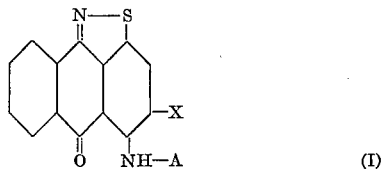

where X represents a hydrogen or halogen atom or a lower alkyl group, and A an aromatic radical which may bear non-water-solubilising substituents, and in which the isothiazolanthrone nucleus may be substituted, if desired, by non-water-solubilising substituents, though it is preferably unsubstituted.

To produce these dyes, 1 mole of a compound of the formula

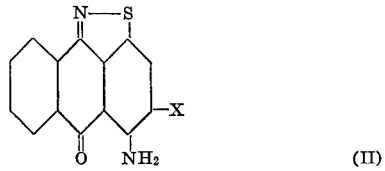

where X has one of the aforestated meanings, is reacted with 1 mole of a compound of the formula $$A-hal \qquad (III)$$

where A has the aforestated meaning and hal represents a fluorine, chlorine, bromine or iodine atom.

Specially preferred dyes are those of the formula

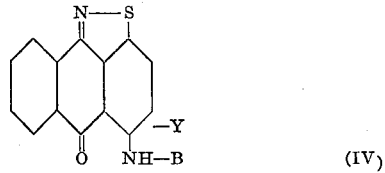

where Y stands for hydrogen, halogen, e.g., chlorine or bromine, or alkyl, e.g. methyl or ethyl, and B represents phenyl which may be unsubstituted or substituted by halogen, e.g. bromine or chlorine, hydroxyl, alkyl, alkoxy, hydroxyalkyl, hydroxyalkoxy, amino, alkylamino, dialkylamino, mercapto, e.g. alkylmercapto, acylamino, e.g. alkylcarbonylamino, or acyl, e.g. acetoxy, a tetrahydronaphthyl radical, e.g.

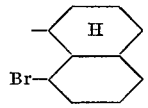

or for a naphthyl radical, in which the alkyl or alkoxy groups respectively, contain 1, 2, 3 or 4 carbon atoms.

For their production 1 mole of a compound of the formula

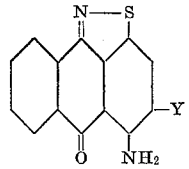

is reacted with 1 mole of a compound of the formula $$B-hal \qquad (VI)$$

where B and Y have one of the meanings assigned to them in the foregoing and hal represents a fluorine, chlorine, bromine or iodine atom.

The reaction is generally performed at temperatures between 100 and 200° C., preferably at 150–180° C., in an inert organic solvent or in an excess of the compound of Formula III. Examples of suitable inert solvents are aliphatic, aromatic, and mixed aliphatic-aromatic hydrocarbons, aromatic nitro compounds, in particular nitrobenzene, alcohols, and aliphatic or aromatic ethers.

The reaction can be carried out at atmospheric pressure, provided the boiling point of the solvent or the compound of Formula III present in excess is higher than the reaction temperature. Solvents having a lower boiling point can be used, for example xylene, toluene or benzene, in which case the reaction is conducted in an autoclave under pressure. The reaction is catalysed by the presence of copper or copper compounds. It is often of advantage to employ acid-binding agents.

Of the compounds of Formula III, the bromine compounds are preferably used because of their high reactivity; their boiling points as well are higher than those of the fluorine or chlorine compounds. The iodine compounds are of little interest owing to their high cost.

Examples of compounds of Formula III are bromobenzene,
1,4-dibromobenzene,
1-bromo-4-methoxybenzene,
1-bromo-4-phenoxybenzene,
1-bromo-3-methylbenzene,
1-bromo-4-methylbenzene,
1-bromo-2,4-dimethylbenzene,
1-bromo-2,4,6-trimethylbenzene,
1-bromo-4-aminobenzene,
1-bromo-4-hydroxybenzene,
1-bromo-4-acetylaminobenzene,
1-bromonaphthalene,
2-bromonaphthalene,
1-bromo-4-ethylbenzene,
1-bromo-4-ethoxybenzene,
1-bromo-4-propoxybenzene,
1-bromo-4-isopropoxybenzene,
1-bromo-4-butoxybenzene,
1-bromo-4-propionylaminobenzene,
1-bromo-4-monomethylaminobenzene,
1-bromo-4-dimethylaminobenzene,
1-bromo-4-monoethylaminobenzene,
1-bromo-4-hydroxyethylbenzene,
4-bromophenol,
ethyleneglycol-parabromobenzene-monoether,
propylene-glycol-parabromobenzene-monoether.

On completion of the reaction the dyes are isolated by distilling off the solvent, using a vacuum or water vapour as required, or alternatively by precipitation.

It is of especial advantage to convert the new dyes thus obtained (which are of orange to scarlet hue) into dye preparations by one of the known methods before they are used. This is accomplished by comminution to an average particle size of 0.01 to 10 microns, or more particularly about 0.1 to 5 microns, if necessary in the presence of dispersants or fillers. For example, the dried dye can be ground with a dispersant and, if necessary, fillers, or it can be kneaded in paste form with a dispersant and then vacuum or jet dried. After the addition of a suitable volume of water, the resulting dye preparations are applied by dyeing, padding or printing methods. The amount generally used in dyeing is up to about 20 grams dye per liter; in padding, up to about 150 grams, or preferably 0.1 to 100 grams, per liter; and in printing, up to about 150 parts per 1000 parts of the printing paste. The liquor ratio can vary within wide limits, for example from about 1:3 to 1:200 or preferably 1:3 to 1:80.

The dyes build up excellently from aqueous dispersion on materials of fully synthetic or semisynthetic high-molecular substances.

Dyeings of high quality are obtained on linear aromatic polyesters, which are generally the polycondensation products of terephthalic acid and glycols, notably ethylene glycol, and are sold under the registered trade marks "Terylene," "Dacron," "Diolen," "Kodel," "Tergal," etc.

Known dyeing methods are used. Polyester fibers can be exhaustion dyed in the presence of carriers in the temperature range of 80–125° C. or in the absence of carriers at about 100° to 140° C. under pressure. Materials of these fibers can be padded with aqueous dispersions of the dyes or printed with pastes, the pad dyeings or prints being fixed at about 140° to 230° C. by means of water vapor or air. In the optimum temperature range of 180–220° C. the dyes diffuse rapidly into polyester fiber and do not then sublime, even when exposed to these high temperatures for some length of time; inconvenient contamination of the equipment is thus avoided. The optimum pH region is 2 to 9 or more specifically 4 to 8.

Generally, one of the normal dispersants or a mixture of dispersants is used, preferably those of anionic or nonionic character. Often about 0.5 gram dispersant per liter of the dyeing medium is sufficient, but larger amounts, e.g. to about 3 grams per liter, can be used. Amounts greater than 5 grams do not usually offer any further advantage. Examples of known anionic dispersants which can be used in the present process are the condensation products of naphthalene sulfonic acids and formaldehyde, in particular dinaphthylmethane disulfonate, the esters of sulfonated succinic acid, Turkey red oil, the alkaline salts of the sulfuric acid esters of fatty alcohols, e.g. sodium lauryl sulfate, sodium cetylsulfate, sulfite cellulose waste liquor, or their alkaline salts, soaps, and the alkaline sulfates of the monoglycerides of fatty acids. Examples of known and very suitable nonionic dispersants are the adducts of about 3–40 mols of ethylene oxide and alkyl phenols, fatty alcohols or fatty amines, and their neutral sulfuric acid esters.

In padding and printing the normal thickening agents are used, e.g., modified or unmodified natural products, such as sodium alginates, British gum, gum Arabic, crystal gum, locust bean gum, gum tragacanth, carboxymethyl cellulose, hydroxyethyl cellulose, starches, and synthetic products, such as polyacrylamides and polyvinyl alcohols.

The dyeings obtained are outstandingly fast to light, heat treatments (thermofixation and pleating), rubbing, water, washing, alkalis and perspiration.

As finely divided pigments they are also suitable for the spin-dyeing of viscose rayon, secondary cellulose acetate, cellulose triacetate and polyacrylonitrile, for the coloration of plastics and for pigment printing.

In the examples the parts and percentages are by weight and the temperatures in degrees centigrade.

EXAMPLE 1

A mixture of 24 parts of 4-amino-(1,9)-isothiazolanthrone, 30 parts of 1-bromo-4-methoxybenzene, 13 parts of anhydrous sodium carbonate and 1 part of crystallised copper sulphate is stirred for 16 hours at 160°. The mixture is then cooled for 1 hour and the precipitate subsequently filtered off, washed with methanol and then with water, and dried at 100°. The final product is an orange-coloured powder which dissolves in chlorobenzene with a reddish orange colour.

Dyeing example

A mixture of 1 part of the dye produced in accordance with Example 1, 1 part of sodium sulphate, 1 part of a sulphonated alcohol of a fatty acid and 1 part of sodium dinaphthylmethane disulphonate is ground in a ball mill to a fine powder. 0.5 part of this dye preparation and 10 parts of emulsified trichlorobenzene are added to 3000 parts of water to form a dyebath. Into this bath 100 parts of a fabric of "Dacron" (registered trademark) polyester fibre are entered at room temperature, whereupon the bath is brought to a boil and held at the boil for 1 hour. The polyester fabric is removed, rinsed and dried. The orange-red dyeing obtained has excellent fastness to light, washing and sublimation. When dyeing is carried out in a pressure machine at 125–140°, the trichlorobenzene addition can be omitted.

EXAMPLE 2

34 parts of 4-amino-(1,9)-isothiazolanthrone and 28 parts of 2-bromonaphthalene are dissolved in 130 parts of nitrobenzene. After the addition of 15 parts of anhydrous sodium carbonate and 1 part of copper sulphate, the mixture is heated in an autoclave for 10 hours at 170°. On cooling the mixture is filtered, and the filter cake is washed with nitrobenzene and ethanol, dried and ground. A red-brown powder is obtained which dyes polyester fibres in scarlet shades with good fastness properties.

EXAMPLE 3

A mixture of 25 parts of 4-amino-3-methyl-(1,9)-isothiazolanthrone, 12 parts of anhydrous sodium carbonate, 1 part of copper sulphate and 100 parts of bromobenzene is heated at 160° for 14 hours in an autoclave. On cooling, the mixture is filtered off and the filter cake washed with bromobenzene and methanol, dried at 100° and ground. An orange-coloured powder is obtained which gives orange dyeings on polyester material having good fastness to light, washing and sublimation.

EXAMPLE 4

15 parts of 4-amino-(1,9)-isothiazolanthrone and 16 parts of 1-bromo-4-monoethylaminobenzene are dissolved in 150 parts of nitrobenzene, after which 8 parts of sodium carbonate and 1 part of cuprous chloride are added. The solution is heated at 160° for 15 hours with reflux. When it has cooled to about 20°, the precipitate is filtered off, washed with ethanol and water and dried at 100°. A red-brown powder is obtained which dyes polyester fibers in red shades having good fastness properties.

EXAMPLE 5

A mixture of 15 parts of 4-amino-(1,9)-isothiazolanthrone, 18 parts of 1-bromo-4-monomethylaminobenzene, 8 parts of sodium carbonate and 1 part of cuprous chloride in 150 parts of nitrobenzene is heated at 160° for 18 hours with reflux. After the solution has cooled to about 20° the dye formed is precipitated with 750 parts of ethanol, filtered off, washed with ethanol and water and dried at 100°.

EXAMPLE 6

A mixture of 12 parts of 4-amino-3-bromo-(1,9)-isothiazolanthrone, 80 parts of bromobenzene, 6 parts of potassium acetate and 0.5 part of copper sulphate is heated for 20 hours at 160° in an autoclave. On cooling, the precipitate formed is filtered off, washed with ethanol and water and dried at 100°. A dye is obtained which dyes polyester fibres in orange shades with good fastness properties.

EXAMPLE 7

A mixture of 15 parts of 4-amino-(1,9)-isothiazolanthrone, 80 parts of bromobenzene, 7 parts of sodium carbonate and 0.5 part of copper sulphate is heated at 160° for 16 hours with pressure. On cooling, the precipitate formed is filtered off, washed with methanol and water and dried at 100°. The dye thus obtained dyes polyester fibres in brilliant orange-yellow shades.

EXAMPLE 8

20 parts of 4-amino-(1,9)-isothiazolanthrone are dissolved in 100 parts of ethanol, with the subsequent addition of 20 parts of 1-bromo-4-methylbenzene, 1 part of copper sulphate and 10 parts of sodium carbonate. The mixture is heated in an autoclave for 12 hours at 180° and, on cooling, the product is filtered off, washed with ethanol and water and dried at 100°. The red powder thus obtained dissolves in chlorobenzene to give orange solutions.

EXAMPLE 9

12 parts of 4-amino-(1,9)-isothiazolanthrone and 15 parts of 1,4-dibromobenzene are dissolved in 100 parts of benzene, and 6 parts of sodium acetate and 1 part of copper acetate are added thereto. The solution is heated in an autoclave for 24 hours at 180° and, on cooling, the precipitate formed is filtered off, washed with benzene and methanol and dried at 100°. The monocondensation product thus obtained dyes polyester fibres in orange shades with good fastness properties.

The following table contains further examples of dyes of Formula I, which are distinguished by the substituents X and A and the shade of the dyeings on polyester fibre.

| Example Number | X | A | Shade on polyester fibre |
|---|---|---|---|
| 10 | H | 4-ethylphenyl | Orange. |
| 11 | H | 4-n-propylphenyl | Do. |
| 12 | H | 2,4-dimethylphenyl | Do. |
| 13 | H | 2-methylphenyl | Do. |
| 14 | H | 2,4,6-trimethylphenyl | Yellow. |
| 15 | H | 2-methyl-4,6-diethylphenyl | Do. |
| 16 | H | α-naphthyl | Orange. |
| 17 | H | Br-(phenyl)-H (naphthyl) | Do. |
| 18 | H | 4-dimethylaminophenyl | Red. |
| 19 | H | 4-diethylaminophenyl | Do. |
| 20 | H | 4-n-propylaminophenyl | Do. |
| 21 | H | 4-acetylaminophenyl | Orange. |
| 22 | H | 4-propionylaminophenyl | Do. |
| 23 | H | 4-aminophenyl | Red. |
| 24 | H | 4-hydroxyphenyl | Scarlet. |
| 25 | H | 4-methoxyphenyl | Do. |
| 26 | H | 4-ethoxyphenyl | Do. |
| 27 | H | 4-n-propoxyphenyl | Do. |
| 28 | H | 4-iso-propoxyphenyl | Do. |
| 29 | H | 4-n-butoxyphenyl | Do. |
| 30 | H | 4-iso-butoxyphenyl | Do. |
| 31 | H | 2-methoxyphenyl | Do. |
| 32 | H | 4-acetoxyphenyl | Orange. |
| 33 | H | 2-chlorophenyl | Yellow. |
| 34 | H | 4-bromophenyl | Orange. |
| 35 | H | 4-methylthiophenyl | Do. |
| 36 | H | 4-ethylthiophenyl | Do. |
| 37 | Br | 4-methylaminophenyl | Red. |
| 38 | Br | 4-ethylaminophenyl | Do. |
| 39 | Cl | 4-hydroxyphenyl | Scarlet. |
| 40 | Br | 4-methoxyphenyl | Orange. |
| 41 | Cl | 4-ethoxyphenyl | Do. |
| 42 | Br | 4-n-propoxyphenyl | Do. |
| 43 | Cl | 4-methylphenyl | Do. |
| 44 | Br | 4-ethylphenyl | Do. |
| 45 | Br | 4-methylthiophenyl | Do. |
| 46 | Br | 4-ethylthiophenyl | Do. |
| 47 | CH₃ | 4-methylphenyl | Do. |
| 48 | CH₃ | 4-β-hydroxyethylphenyl | Do. |
| 49 | CH₃ | 4-β-hydroxyethoxyphenyl | Red. |
| 50 | CH₃ | 4-ethylaminophenyl | Do. |
| 51 | CH₃ | 4-dimethylaminophenyl | Do. |
| 52 | CH₃ | 4-N,N-di-(τ-hydroxyethyl)-aminophenyl | Do. |
| 53 | CH₃ | 4-hydroxyphenyl | Scarlet. |
| 54 | CH₃ | 4-(γ-hydroxypropyl)-phenyl | Do. |
| 55 | CH₃ | 4-ethoxyphenyl | Do. |
| 56 | CH₃ | 4-n-propoxyphenyl | Do. |
| 57 | CH₃ | 4-chlorophenyl | Orange. |
| 58 | CH₃ | 4-methylthiophenyl | Do. |
| 59 | CH₃ | 4-ethylthiophenyl | Do. |
| 60 | CH₃ | 4-acetylaminophenyl | Do. |
| 61 | —C₂H₅ | phenyl | Do. |
| 62 | H | 4-β-hydroxyethoxyphenyl | Red. |
| 63 | H | 4-β-hydroxyethylphenyl | Do. |

Formulae of representative dyes of the foregoing examples are as follows:

Example 1:

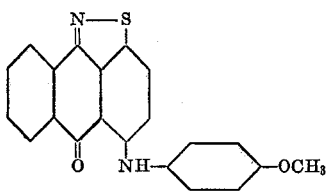

Example 14:

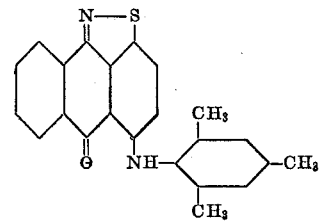

Example 26:

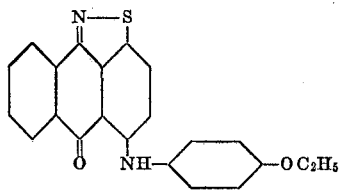

Example 29:

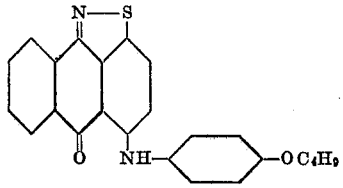

Example 62:

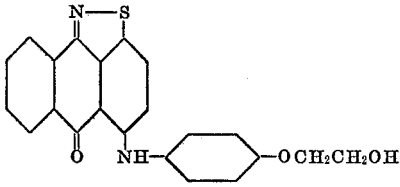

Example 63:

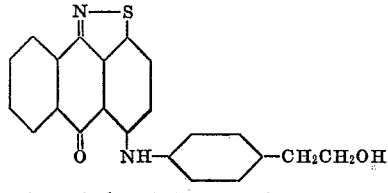

Having thus disclosed the invention what we claim is:

1. Disperse dye of the formula

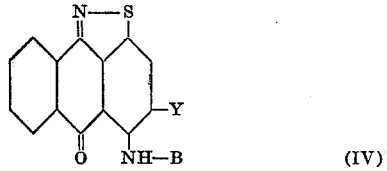

(IV)

where Y represents a member of the group consisting of hydrogen, halogen, methyl and ethyl, and B represents a member of the group consisting of an unsubstituted phenyl radical; a phenyl radical substituted by halogen, hydroxy, alkyl, alkoxy, hydroxyalkyl, hyroxyalkoxy, amino, alkylamino, dialkylamino, mercapto, alkylcarbonylamino and alkylcarbonyl, a tetrahydronaphthyl radical and a naphthyl radical, the alkyl or alkoxy groups respectively containing 1, 2, 3 or 4 carbon atoms.

2. The dye according to claim 1 of the formula

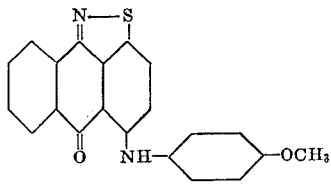

3. The dye according to claim 1 of the formula

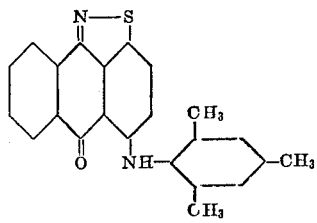

4. The dye according to claim 1 of the formula

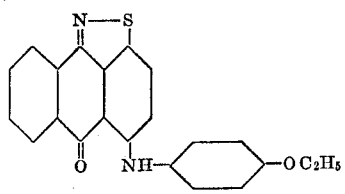

5. The dye according to claim 1 of the formula

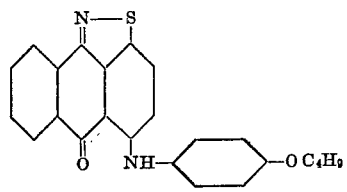

6. The dye according to claim 1 of the formula

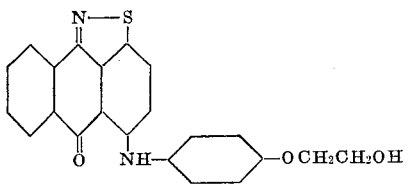

7. The dye according to claim 1 of the formula

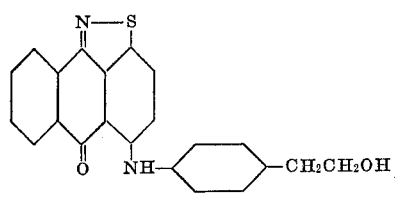

References Cited

UNITED STATES PATENTS

| | | | |
|---|---|---|---|
| 2,714,596 | 8/1955 | Gutzwiller et al. | 260—303 |
| 3,100,132 | 8/1963 | Jenny et al. | 260—303 |

ALEX MAZEL, Primary Examiner

R. J. GALLAGHER, Assistant Examiner

U.S. Cl. X.R.

8—39; 260—40